(12) United States Patent
Meng et al.

(10) Patent No.: US 9,817,255 B2
(45) Date of Patent: Nov. 14, 2017

(54) TAPE ATTACHMENT FIXTURE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Qinglong Meng, Beijing (CN); Linlin Wang, Beijing (CN); Yinchu Zhao, Beijing (CN); Zhiyu Qian, Beijing (CN); Yong Sun, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/088,695

(22) Filed: Apr. 1, 2016

(65) Prior Publication Data

US 2016/0299364 A1    Oct. 13, 2016

(30) Foreign Application Priority Data

Apr. 8, 2015  (CN) .......................... 2015 1 0163229

(51) Int. Cl.
*H01L 21/768* (2006.01)
*G02F 1/13* (2006.01)

(52) U.S. Cl.
CPC .................................. *G02F 1/1303* (2013.01)

(58) Field of Classification Search
CPC ............. H01L 21/02326; H01L 21/022; H01L 21/0228; C23C 16/56; C23C 16/452; C23C 16/045; C23C 16/24; C23C 16/30; C23C 16/345; C23C 16/401; C23C 16/36
See application file for complete search history.

(56) References Cited

FOREIGN PATENT DOCUMENTS

| CN | 101604076 A | 12/2009 |
|---|---|---|
| CN | 202102163 U | 1/2012 |
| CN | 102759812 A | 10/2012 |
| CN | 202667756 U | 1/2013 |
| CN | 203104935 U | 7/2013 |
| CN | 103693498 A | 4/2014 |
| JP | H0983114 A | 3/1997 |

OTHER PUBLICATIONS

Zhang et al., Chinese Patent Publication CN202102163, Jan. 2012, machine translation.*
Translation of First Chinese Office Action.*
First Office Action for Chinese Application No. 201510163229.1, dated Mar. 31, 2017, 7 Pages.

* cited by examiner

*Primary Examiner* — Tracie Y Green
(74) *Attorney, Agent, or Firm* — Brooks Kushman P.C.

(57) ABSTRACT

The present disclosure provides a tape attachment fixture, including: a bearing platform configured to bear a liquid crystal panel; a movement device connected to the bearing platform, and configured to control movement of the bearing platform when a tape is to be attached to different positions of the liquid crystal panel; and a working table fixedly connected to the movement device. The working table includes an accommodation cavity for accommodating the bearing platform.

16 Claims, 2 Drawing Sheets

TAPE ATTACHMENT FIXTURE

CROSS-REFERENCE TO RELATED APPLICATION

The present application claims a priority of the Chinese patent application No. 201510163229.1 filed on Apr. 8, 2015, which is incorporated herein by reference in its entirety.

TECHNICAL FIELD

The present disclosure relates to the manufacture of display products, in particular to a tape attachment fixture.

BACKGROUND

For the miniaturization of a thin film transistor-liquid crystal display (TFT-LCD), the thinness of a liquid crystal panel is highly demanded, and at this point, the liquid crystal panel is secured onto a backlight source through a tape rather than a metal bezel. Currently, the tape is usually attached manually. However, there are the following drawbacks during the manual attachment of the tape.

1. Because the tape needs to be attached at a plurality of positions on the liquid panel, it is necessary to move the liquid crystal panel manually during the attachment. When moving the liquid crystal panel, an operator may touch or press the liquid crystal panel many times, and thereby the product quality will be adversely affected somewhat. 2. Tape waste is relatively light and uneasy to be recovered, so a working environment will be adversely affected. 3. During the attachment, different tapes may be used for different liquid crystal panels, and even for the same liquid crystal panel. The taps are usually placed randomly, which easily causes incorrect use of tapes of different types, lengths or any other parameters.

SUMMARY

An object of the present disclosure is to provide a tape attachment fixture, so as to prevent the quality of a liquid crystal panel from being adversely affected when the liquid crystal panel is moved manually.

The present disclosure provides in some embodiments a tape attachment fixture, including: a bearing platform configured to bear a liquid crystal panel; a movement device connected to the bearing platform, and configured to control movement of the bearing platform when a tape is to be attached to different positions of the liquid crystal panel; and a working table fixedly connected to the movement device and including an accommodation cavity for accommodating the bearing platform.

Further, the movement device includes: a rotary mechanism connected to the bearing platform and configured to control a rotary movement of the bearing platform in a horizontal plane; and a lifting mechanism connected to the rotary mechanism and configured to control an up-and-down movement of the bearing platform in a vertical direction.

Further, the movement device includes: a lifting mechanism connected to the bearing platform and configured to control an up-and-down movement of the bearing platform in a vertical direction; and a rotary mechanism connected to the lifting mechanism and configured to control a rotary movement of the bearing platform in a horizontal plane.

Further, the rotary mechanism is a rotary cylinder, and the lifting mechanism is a lifting cylinder.

Further, the bearing platform is provided with a positioning mechanism arranged on the bearing platform for positioning the liquid crystal panel.

Further, the positioning mechanism includes a plurality of positioning pins arranged on the bearing platform.

Further, the positioning mechanism includes a plurality of grooves defined in the bearing platform and a positioning pin slidably arranged in each of the grooves.

Further, notches are defined in at least two opposite sides of the bearing platform and configured to pick the liquid crystal panel therefrom and place the liquid crystal panel thereinto.

Further, the tape attachment fixture further includes a first switch and a second switch arranged at an identical side of the working table and configured to be turned on simultaneously so as to control an on state and an off state of the movement device, and the first switch and the second switch are arranged at two ends of the identical side of the working table, respectively.

Further, the tape attachment fixture further includes a waste recovery device configured to recover a tape waste.

Further, the waste recovery device includes: a waste recovery groove including a case having an opening in communication with a through hole in the working table; and a vacuum adsorption mechanism in communication with the waste recovery groove via a pipe and configured to recover the tape waste in the waste recovery groove in a vacuum adsorption manner. The through hole is arranged at a side of the accommodation cavity. The pipe is connected to a side wall of the waste recovery groove.

Further, the tape attachment fixture further includes an electrostatic charge elimination mechanism secured onto a bracket at a side of the working table and configured to eliminate an electrostatic charge.

Further, the electrostatic charge elimination mechanism is an ionizing air blower.

Further, a plurality of material tanks is arranged on the bracket and configured to receive the tape, and the material tanks are located below the electrostatic charge elimination mechanism.

Further, the tape attachment fixture further includes a bracket arranged at a side of the working table and a plurality of material tanks arranged on the bracket.

Further, the material tanks are arranged above the accommodation cavity.

According to the embodiments of the present disclosure, it is able to effectively reduce the times an operator may touch the liquid crystal panel during the tape attachment, thereby to reduce imperfections such as Zara caused by the touch and improve the yield of the product.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Figure 1:
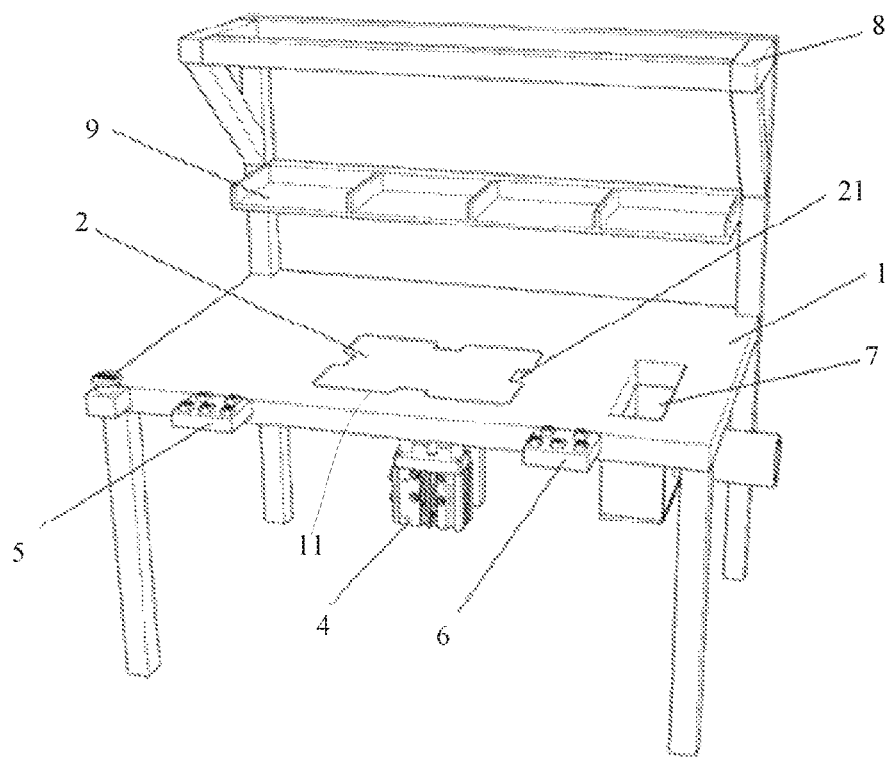
FIG. 1 is a schematic view showing a tape attachment fixture according to one embodiment of the present disclosure.

As shown in FIG. 1, the present disclosure provides in some embodiments a tape attachment fixture. The tape attachment fixture includes a bearing platform 2, a movement device and a working table 1. The bearing platform 2 is configured to bear a liquid crystal panel. The movement device is connected to the bearing platform 2 and configured to control the movement of the bearing platform 2 when attaching a tape to different positions of the liquid crystal panel. The working table 1 is fixedly connected to the movement device. The working table 1 includes an accommodation cavity 11 for accommodating the bearing platform 2.

Through the movement device, the bearing platform 2 for bearing the liquid crystal panel may be moved automatically, i.e., the liquid crystal panel is not touched by an operator during the movement. As a result, it is able to effectively reduce the times the operator may touch the liquid crystal panel during the tape attachment, thereby to reduce imperfections such as Zara caused by the touch and improve the yield of the product.

Figure 2:
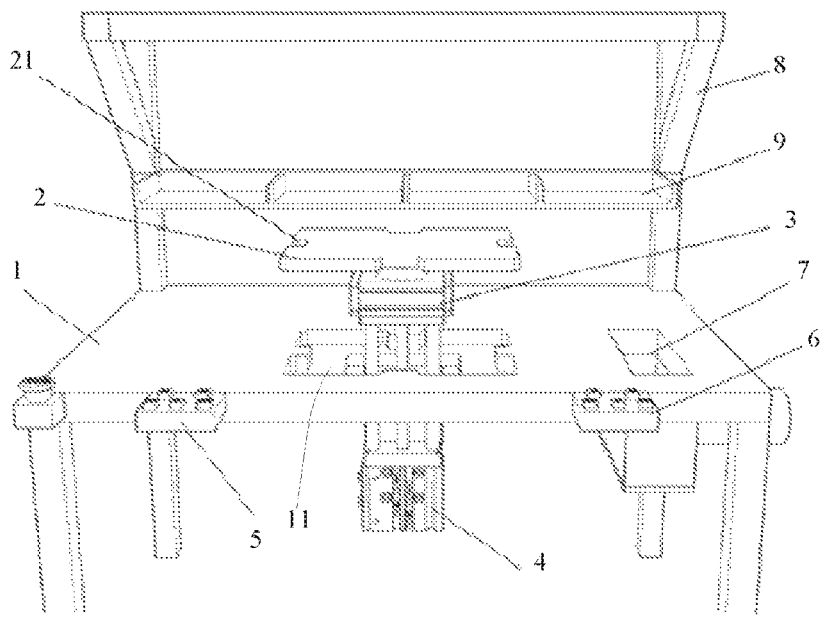
FIG. 2 is another schematic view showing the tape attachment fixture according to one embodiment of the present disclosure.

The movement device may be of various structures, as long as it may be used to control the movement of the bearing platform. As shown in FIG. 2, the movement device includes a rotary mechanism 3 and a lifting mechanism 4. The rotary mechanism 3 is connected to the bearing platform 2 and controls a rotary movement of the bearing platform 2 in a horizontal plane. The lifting mechanism 4 is connected to the rotary mechanism 3 and controls an up-and-down movement of the bearing platform 2 in a vertical direction.

In an alternative embodiment, the movement device includes a rotary mechanism and a lifting mechanism. The lifting mechanism is connected to the bearing platform 2 and controls an up-and-down movement of the bearing platform 2 in a vertical direction. The rotary mechanism is connected to the lifting mechanism and controls a rotary movement of the bearing platform 2 in a horizontal plane. This embodiment may be achieved by exchanging positions of the rotary mechanism 3 and the lifting mechanism 4 shown in FIG. 2.

Optionally, the rotary mechanism 3 is a rotary cylinder, and the lifting mechanism 4 is a lifting cylinder. However, the structures of the rotary mechanism 3 and the lifting mechanism 4 are not limited thereto.

Figure 4:
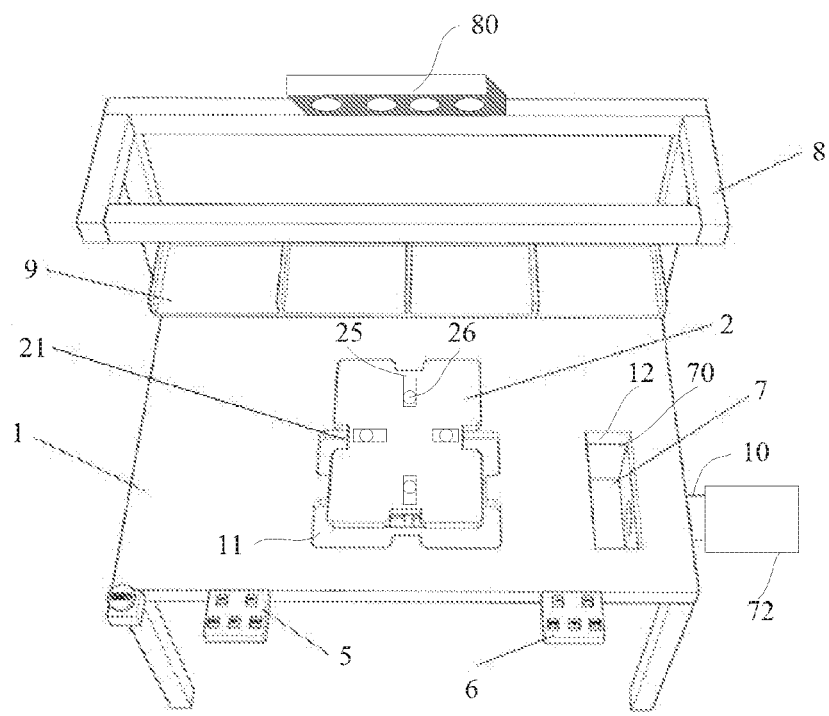
FIG. 4 is yet another schematic view showing the tape attachment fixture according to one embodiment of the present disclosure.

Optionally, the bearing platform 2 is provided with a positioning mechanism for positioning the liquid crystal panel (as shown in FIG. 4). When the liquid crystal panel is placed on the bearing platform 2 without being secured or positioned, as the bearing platform 2 moves, the liquid crystal panel may move relative to the bearing platform 2 and thereby be damaged. In the embodiments of the present disclosure, the presence of the positioning mechanism can prevent the movement of the liquid crystal panel, thereby to improve the product yield.

The positioning mechanism may include positioning pins arranged on the bearing platform 2. Further, the positioning pins may be movable arranged on the bearing platform 2, an as to be adapted to the liquid crystal panels in different dimensions. For example, as shown in FIG. 4, the positioning mechanism includes a plurality of grooves 25 defined in the bearing platform 2 and a positioning pin 26 slidably arranged in each groove 25. During the use, positions of the positioning pins 26 in the respective grooves 25 may be adjusted in accordance with the dimension of the liquid crystal panel, so that each positioning pin 26 abuts against one side of the liquid crystal panel so as to position the liquid crystal panel. At this point, the positioning pin 26 may be secured through a bolt.

Figure 3:
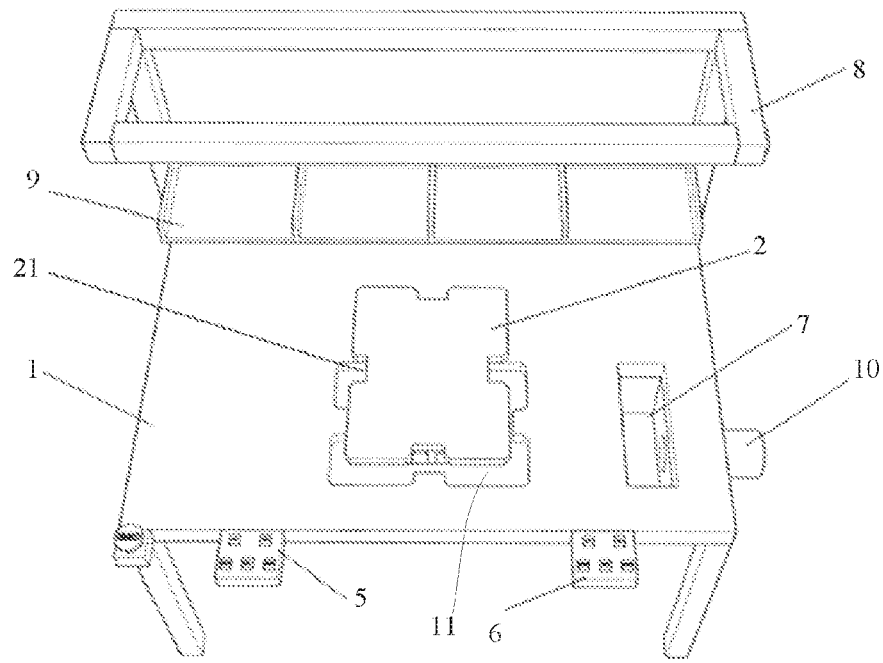
FIG. 3 is a schematic view showing the tape attachment fixture after a bearing platform thereof has been rotated according to one embodiment of the present disclosure.

As shown in FIG. 3, optionally, notches 21 are defined in at least two opposite sides of the bearing platform 2 and configured to pick the liquid crystal panel therefrom and place the liquid crystal panel thereinto. The presence of notches 21 facilitates picking or placing the liquid crystal panel, thereby preventing the liquid crystal panel from being damaged when picking or placing the liquid crystal panel.

Optionally, the notches 21 are defined in all the four sides of the bearing platform 2.

Optionally, the tape attachment fixture further includes a first switch 5 and a second switch 6 arranged at an identical side of the working table 1 and configured to be turned on simultaneously so as to control an on state and an off state of the movement device. The first switch and the second switch are arranged at two ends of the identical side of the working table, respectively.

In the embodiments of the present disclosure, the first switch 5 and the second switch 6 are controlled manually and arranged at two ends of the same side of the working table 1, respectively. In addition, the first switch 5 and the second switch 6 need to be turned on simultaneously, so as to control the operation of the movement device. In other words, the operator needs to control the first switch 5 and the second switch 6 with his two hands respectively. As a result, it is able to, during the movement of the bearing platform, prevent the hands of the operator from being hurt when the hands are placed on the working table.

Optionally, the tape attachment fixture further includes a waste recovery device configured to recover a tape waste, so as to provide a clean working environment.

Further, as shown in FIG. 4, the waste recovery device includes: a waste recovery groove 7 and a vacuum adsorption mechanism 72. The waste recovery groove 7 includes a case having an opening 70 in communication with a through hole 12 in the working table 1. The through hole 12 is arranged at a side of the accommodation cavity 11. The vacuum adsorption mechanism 72 is in communication with the waste recovery groove 7 via a pipe 10 and configured to recover the tape waste in the waste recovery groove 7 in a vacuum adsorption manner. The pipe 10 is connected to a side wall of the waste recovery groove 7.

Optionally, as shown in FIG. 4, the tape attachment fixture further includes an electrostatic charge elimination mechanism 80 for eliminating electrostatic charge. The electrostatic charge elimination mechanism 80 is secured onto a bracket 8 at a side of the working table 1. In this way, it is able to prevent the occurrence of electrostatic discharge (ESD) during the operation, thereby to improve the product quality.

Further, the electrostatic charge elimination mechanism 80 may be an ionizing air blower.

Optionally, a plurality of material tanks 9 is arranged on the bracket 8 for accommodating tapes. The material tanks 9 are located below the electrostatic charge elimination mechanism 80. The material tanks 9 can sort the tapes so that each tape can be placed in one corresponding material tank 9 according to the kind of the respective tape, thereby to prevent the use of the tapes in confusion.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A tape attachment fixture, comprising:
 a bearing platform configured to bear a liquid crystal panel;
 a movement device connected to the bearing platform, and configured to control movement of the bearing platform when a tape is to be attached to different positions of the liquid crystal panel; and
 a working table fixedly connected to the movement device and including an accommodation cavity for accommodating the bearing platform;
 wherein the bearing platform is provided with a positioning mechanism for positioning the liquid crystal panel, and the positioning mechanism comprises at least two pairs of oppositely arranged grooves defined in the bearing platform and a positioning pin slidably arranged in each of the grooves.

2. The tape attachment fixture according to claim 1, wherein the movement device comprises:
 a rotary mechanism connected to the bearing platform and configured to control a rotary movement of the bearing platform in a horizontal plane; and
 a lifting mechanism connected to the rotary mechanism and configured to control an up-and-down movement of the bearing platform in a vertical direction.

3. The tape attachment fixture according to claim 2, wherein the rotary mechanism is a rotary cylinder, and the lifting mechanism is a lifting cylinder.

4. The tape attachment fixture according to claim 1, wherein the movement device comprises:
 a lifting mechanism connected to the bearing platform and configured to control an up-and-down movement of the bearing platform in a vertical direction; and
 a rotary mechanism connected to the lifting mechanism and configured to control a rotary movement of the bearing platform in a horizontal plane.

5. The tape attachment fixture according to claim 4, wherein the rotary mechanism is a rotary cylinder, and the lifting mechanism is a lifting cylinder.

6. The tape attachment fixture according to claim 1, wherein the positioning mechanism comprises a plurality of positioning pins arranged on the bearing platform.

7. The tape attachment fixture according to claim 1, wherein the bearing platform is provided with notches which are defined in at least two opposite sides of the bearing platform and configured to pick or place the liquid crystal panel.

8. The tape attachment fixture according to claim 1, further comprising a first switch and a second switch arranged at an identical side of the working table and configured to be turned on simultaneously so as to control an on state and an off state of the movement device; wherein the first switch and the second switch are arranged at two ends of the identical side of the working table, respectively.

9. The tape attachment fixture according to claim 1, further comprising a waste recovery device configured to recover a tape waste.

10. The tape attachment fixture according to claim 9, wherein the waste recovery device comprises:
 a waste recovery groove comprising a case having an opening in communication with a through hole in the working table; wherein the through hole is arranged at a side of the accommodation cavity; and
 a vacuum adsorption mechanism in communication with the waste recovery groove via a pipe and configured to recover the tape waste in the waste recovery groove in a vacuum adsorption manner; wherein the pipe is connected to a side wall of the waste recovery groove.

11. The tape attachment fixture according to claim 1, further comprising an electrostatic charge elimination mechanism secured onto a bracket at a side of the working table and configured to eliminate electrostatic charge.

12. The tape attachment fixture according to claim 11, wherein the electrostatic charge elimination mechanism is an ionizing air blower.

13. The tape attachment fixture according to claim 11, further comprising a plurality of material tanks arranged on the bracket and configured to receive the tape; wherein the material tanks are located below the electrostatic charge elimination mechanism.

14. The tape attachment fixture according to claim 1, further comprising a bracket arranged at a side of the working table and a plurality of material tanks arranged on the bracket.

15. The tape attachment fixture according to claim 14, wherein the material tanks are arranged above the accommodation cavity.

16. A tape attachment fixture, comprising:
 a bearing platform configured to bear a liquid crystal panel;
 a movement device connected to the bearing platform, and configured to control movement of the bearing platform when a tape is to be attached to different positions of the liquid crystal panel;
 a working table fixedly connected to the movement device and including an accommodation cavity for accommodating the bearing platform; and
 a first switch and a second switch arranged at a first side of the working table and configured to be turned on simultaneously so as to control an on state and an off state of the movement device, wherein a portion of the working table at the first side comprises a center region and two end regions at two opposite sides of the center region respectively, and the first switch and the second switch are arranged at the two opposite sides of the center region respectively.

* * * * *